Figure 1:
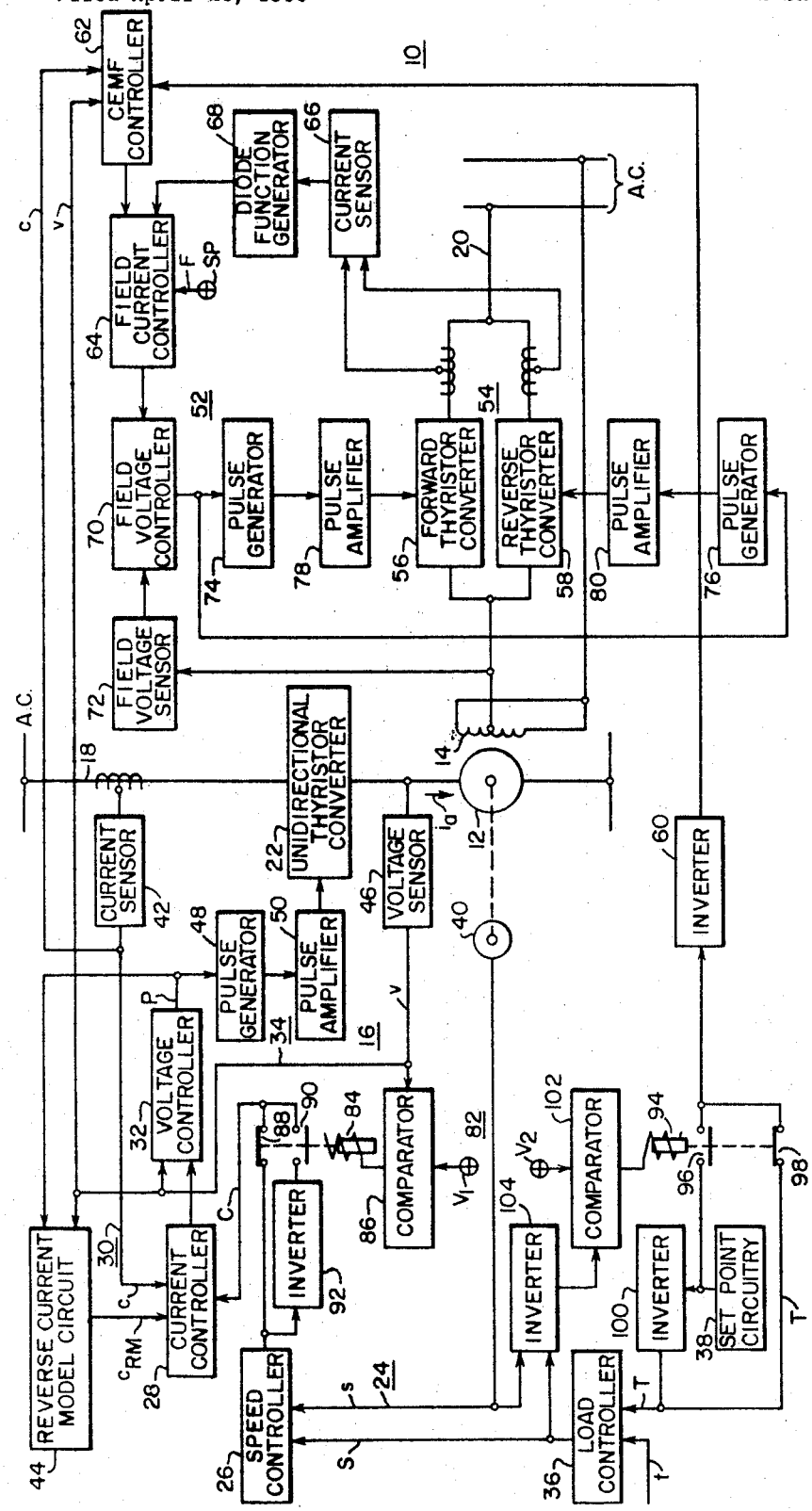

United States Patent Office

3,401,325
Patented Sept. 10, 1968

3,401,325
SPEED REGULATING SYSTEM PROVIDING SLOW-
DOWN CONTROL FOR A MOTOR HAVING A
UNIDIRECTIONAL CONVERTER ARMATURE
SUPPLY
Loren F. Stringer, Williamsville, N.Y., assignor to West-
inghouse Electric Corporation, Pittsburgh, Pa., a cor-
poration of Pennsylvania
Filed Apr. 25, 1966, Ser. No. 544,795
8 Claims. (Cl. 318—302)

The present invention relates to motor speed regulating systems and more particularly to systems which provide speedup and slowdown control for motors having a unidirectional converter armature supply.

Variable speed direct current motors are commonly employed to produce the drive power required for operating various types of equipment such as rolls in a metal reduction rolling mill. A power converter formed from solid state switches such as thyristors can be used to convert available alternating current power to the direct current power required for motor armature energization. With high drive power requirements, the cost of armature power conversion circuitry can be sizeable and conversion economy is often obtained in particular applications by using conversion circuitry which supplies armature current only in a single direction. Anti-parallel conversion circuitry for oppositely directed armature current is thus avoided to reduce hardware costs by a substantial amount.

With a unidirectional armature power converter, motor speed can be controllably elevated by well-known gating control techniques, but slowdown is obtained only by coasting under load since reverse armature current cannot be used to produce regenerative braking. In many cases, it is desirable that drive speed be rapidly regulated in either direction to a predetermined value or that it be rapidly changed from a first predetermined value to a predetermined lower value without awaiting the coastdown time under light or heavy load conditions. As an illustration of the latter need, roll speed may be at a high controlled operating value as a strip pass is completed in a metal rolling mill, yet for high mill productivity it is desirable that the roll speed be quickly dropped to the required lower strip entry value as the next strip is threaded into the mill.

In accordance with the broad principles of the present invention, a direct current motor control system comprises a unidirectional converter operated by an armature feedback control to control armature voltage and motor speed. The armature feedback system preferably includes cascaded speed and armature current and armature voltage control loops. A field control is also included in the motor control system and it is preferably arranged to control the field excitation for set point regulation of armature counterelectromotive force. Speed control is obtained in the normal manner with armature current flow in the permitted direction when actual speed is less than the command speed. To provide fast and stable speed control when actual speed is above the command speed even though armature current cannot flow in the opposite regenerating direction, means are provided for detecting a predetermined condition associated with motor overspeed so as to operate the field control to produce field excitation reversal and so as to operate the armature control to produce forward armature current flow. Regenerative power then flows from the motor to the power supply lines to produce controlled braking action until the motor reaches the brake cutoff speed at or near the set point speed.

It is therefore an object of the invention to provide a novel and improved motor control system which provides economic and efficient speed control for a direct current motor having a unidirectional converter armature supply.

Another object of the invention is to provide a novel motor speed control system for a direct current motor having a unidirectional converter armature supply such that the operating speed of apparatus driven by the motor can be quickly and stably changed for increased operating efficiency and profitability.

A further object of the invention is to provide a novel and improved motor speed control system for a direct current motor having a unidirectional converter armature supply such that motor speed reduction can be controllably and quickly and stably obtained.

Figure 2:
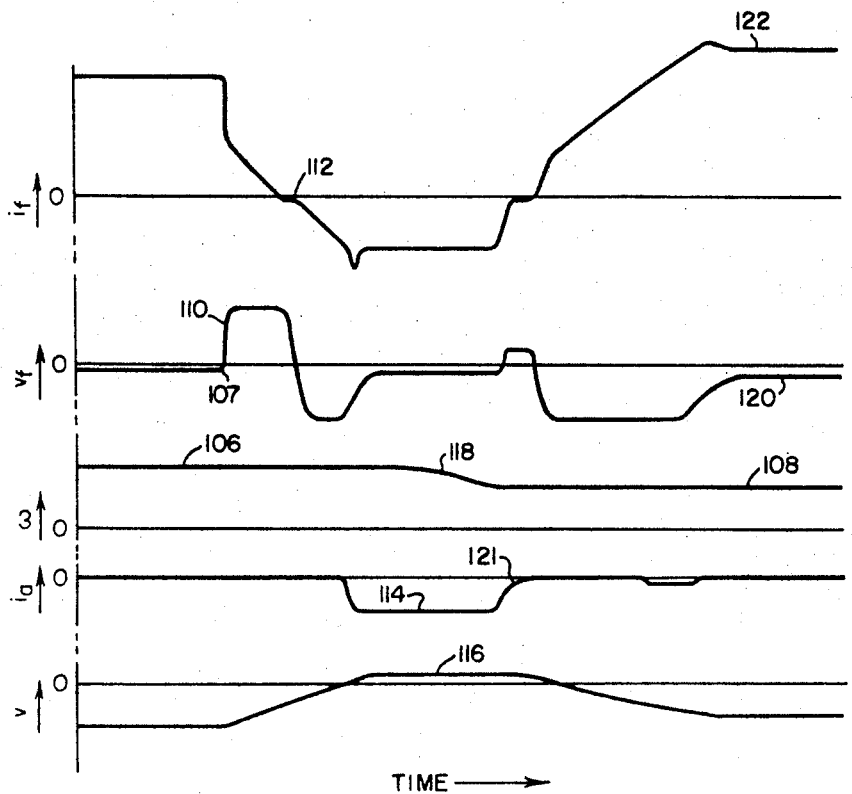

These and other objects of the invention will become more apparent upon consideration of the following detailed description along with the attached drawings, in which:

FIG. 1 shows a schematic diagram of a motor speed control system arranged in accordance with the principles of the invention; and FIG. 2 graphically illustrates the relations between field and armature currents and voltages as motor speed is corrected by a sample motor control system built and operated in accordance with the principles of the invention.

More specifically, there is shown in FIG. 1 a control system 10 arranged in accordance with the principles of the invention to operate a direct current motor having an armature 12 and a shunt field 14 and having as an example a power rating of 5,000 horsepower. Armature voltage is determined by an armature control 16 and preferably is supplied from a three phase source indicated schematically by line 18. Field voltage similarly is obtained from a three phase source indicated by line 20.

A unidirectional converter 22 controls the effective positive or negative voltage applied to the armature 12, but armature current can flow in only one direction such as the direction designated by $i_a$. Preferably, the converter 22 is a standard three phase thyristor unidirectional converter power supply so that the advantages of solid state circuitry can be realized in system use.

Cascaded feedback loops in the armature control 16 promote fast and stable armature voltage control for regulating the motor speed to a set point speed. In this case, a speed control feedback loop 24 includes a speed controller 26 which is cascaded into an armature current controller 28 in an armature current control feedback loop 30. In turn, the current controller 28 is cascaded into an armature voltage controller 32 in an armature voltage control feedback loop 34.

A set point signal S for the speed controller 26 may be manually or otherwise set but in this case is established by a load controller 36 which itself has a speed set point signal T generated by set point circuitry 38. The set point T in turn may be controlled by some means such as a computer (not shown). The load controller 36 sums the set point signal T and the actual value $t$ of a negative feedback variable such as load tension to produce the speed set point signal S at the input of the speed controller 26. A negative feedback signal $s$ is generated by a suitable tachometer 40 to represent the actual motor speed, and the signals S and $s$ are summed by the speed controller 26 to produce a speed error signal. The speed controller output forms a set point signal C for the armature current controller 28.

A suitable armature current sensor 42 such as a current transformer produces a negative feedback signal $c$ representing actual armature current for summing with the set point signal C by the current controller 28. In order to prevent relaxation oscillations otherwise caused in the rotating motor shaft by controller saturation when the motor develops an overspeed state, it is preferred in this case that a reverse armature current model circuit 44 produce a simulated armature current signal $c_{RM}$ for application to the current controller 28 and summation with the set point signal C when forward armature current flow drops to zero. The theory and manner by which improved system dynamic stability is achieved with use of a reverse current model similar to the circuit 44 is more fully disclosed in a copending application entitled "Non-Regenerating DC Motor Regulating Circuit Having Improved Stability," Ser. No. 533,924 filed by the present inventor on Mar. 14, 1966 and assigned to the present assignee.

The operational output of the current controller 28 is a set point signal V for the voltage controller 32. A suitable voltage sensor 46 such as a high frequency push-pull magnetic amplifier produces a negative feedback signal $v$ which is summed with the set point signal V by the voltage controller 32. A voltage controller output signal P is applied to the input of thyristor gating circuitry to control the pulse generation rate of a suitable pulse generator 48. The energy level of the timed pulses is raised by a suitable pulse amplifier 50 and coupled with the thyristor converter 22, preferably to control the firing angle of the various converter thyristors. Thus, the voltage controller 32 operates as the terminal control device of the cascaded feedback network to vary the firing angle of the armature converter thyristors and thereby control the effective armature voltage and the motor speed. It is further noted that the output of the voltage sensor 46 and the output of the voltage controller 32 are also applied to the reverse current model circuit 44 as described for a similar system in the aforementioned copending application.

All of the controllers can be standard commercially available operational amplifiers. Suitable feedback circuitry is used in each individual amplifier to produce the transfer function desired for it in use. Preferably, the speed and current and voltage controllers all have proportional plus integral transfer functions.

Overload protection can be suitably provided in the armature and field circuitry. Similarly, limits can be suitably placed on control set points in order to avoid excessive demands on the motor. All overload and control limit protection is provided so as to allow minimal interference with normal controlled operation of the motor.

Field voltage is applied to the field windings 14 by a field control 52 and specifically by a power converter package 54. Effective DC field voltage is controlled to produce field current flow in either direction, and for this purpose the power converter package 54 preferably is a suitably rated and standard dual thyristor converter including a forward thyristor converter 56 and a reverse or anti-parallel thyristor converter 58. At the relatively low field power levels, dual conversion has more economic feasibility than at the high armature power levels. However, as a possible alternate arrangement, a unidirectional converter (not shown) can be employed in conjunction with field reversing line contactors (not shown) operated when field reversal is to be effected.

Field excitation is controlled to regulate the armature counterelectromotive force to a set point value, in this case the value corresponding to the speed set point signal T. Thus, the set point signal T is normally a positive signal and is applied through an inverter 60 as a normally negative input to a CEMF controller 62 in the field control 52. The primary purpose of the counterelectromotive force control is to provide for speed regulation at speeds above the speed value at which maximum rated armature CEMF is developed with maximum field flux. Higher speeds are realized by decreased field flux with the armature CEMF clamped at the maximum rated value.

The negative signal T forms the CEMF set point for the CEMF controller 62 for summation with the armature current and voltage feedback signals $c$ and $v$ from the sensors 46 and 42. An output from the CEMF controller 62 is cascaded into a field current feedback control loop and specifically into a summing field current controller 64 which is provided with a weak field set point F. Field current feedback is produced by a current sensor 66 such as a current transformer having respective windings in series with the forward and reverse converters 56 and 58. The current sensor output is preferably applied to a diode function generator 68 which preferably applies to the field current controller 64 a negative feedback signal $f$ functionally related to the field current signal substantially according to the characteristic relation between the field magnetic flux and the field current.

The output of the CEMF controller 62 is normally positive with a negative CEMF set point, and in turn the field current controller summation output normally has a negative polarity and provides a set point for a field voltage controller 70. Negative feedback voltage from a suitable field voltage sensor 72 is summed with the voltage set point by the field voltage controller 70, and the resultant output signal is applied to a forward pulse generator 74 and a reverse pulse generator 76 for thyristor firing angle control in the converters 56 and 58.

If the field voltage controller output signal is positive, the forward pulse generator 74 operates through a pulse amplifier 78 to provide thyristor firing angle control in the forward converter 56 thereby producing forward field voltage and forward field current. Simultaneously, the reverse field converter 58 is suitably cutoff or suppressed. Similarly, if the field voltage controller output signal is negative, the pulse generator 76 operates through a pulse amplifier 80 to produce thyristor firing angle control in the reverse converter 58 thereby producing reverse field voltage and reverse field current.

When the motor is operating at a speed below the set point speed, the armature control 16 receives a positive speed error signal C (i.e., the set point voltage S is negative and greater in absolute magnitude than the positive tachometer voltage signal $s$), and the voltage controller 32 causes the thyristor firing angle to advance in the unidirectional thyristor converter 22 to raise the effective armature voltage and the motor speed. If the set point speed requires greater than rated armature CEMF voltage at maximum field, the field control 52 weakens the forward field excitation to clamp the armature CEMF at the rated maximum since the speed error is then satisfied without further armature voltage build up. As the set point speed is reached, the control 10 stabilizes the motor operation.

If the set point speed is decreased or if motor speed increases due to a load decrease at a constant speed set point, the speed error signal and the current set point signal C become negative. The voltage controller 32 then causes thyristor firing angle retardation in the converter 22 and a negative internal converter voltage is developed. Forward armature current is prevented by the armature CEMF voltage, while negative or reverse armature current is blocked from flowing by the unidirectional converter 22. Therefore, speed reduction occurs only by coastdown unless and until a positive braking effect is produced in some manner. While armature current is blocked, the current controller feedback signal C is zero but the current simulation signal $c_{RM}$ is then operative and summed with the set point signal C to prevent current controller saturation.

To produce positive braking, a braking control 82 causes reversal of the field excitation and simultaneously causes forward regenerating or braking current to flow in the motor armature 12. Generator power then flows from the motor to the source lines and speed reduction is achieved under controlled conditions. Preferably, operation of the braking control 82 is withheld until the motor speed is a predetermined amount above the set speed. This provision allows an operating margin within which speed reduction is achieved by coastdown to avoid rapid alternation in the direction of field excitation for small deviations in motor speed and generally to provide improved conditions for dynamic stability. As an example, the braking control 82 can become operative when the actual motor speed exceeds the set point speed by 5%.

In the present embodiment of the invention, the braking control 82 includes a relay 84 or the like which is operated by comparator 86 connected to the armature voltage sensor 46. When the armature voltage becomes negative and exceeds a set point voltage $V_1$ corresponding to a 5% overspeed condition, the relay 84 is operated to open a normally closed contact 88 and to close a normally open contact 90. An inverter 92 is thus coupled between the speed controller 26 and the current controller 28 to produce a positive set point signal for the current controller 28 even though the speed controller output signal is negative under overspeed conditions.

The voltage controller 32 thus receives a positive set point signal and causes advancement of the thyristor firing angle to develop a positive internal converter voltage. Braking current flows in the forward direction through the motor armature 12 as field excitation is simultaneously reversed. During operation of the braking control 82, the reverse current model circuit 44 is preferably cut off by relay or other suitable control since the armature braking current causes the negative current feedback signal c to be applied again to the current controller 28.

The braking control 82 further includes a field set point relay 94 or similar means to control the polarity of the CEMF set point signal T. As previously indicated, the CEMF set point signal as applied at the input of the CEMF controller 62 normally has a negative polarity. The negative CEMF set point voltage results in forward field voltage and forward field current. When the relay 94 is operated upon demand for braking, a normally open contact 96 is closed and a normally closed contact 98 is opened. An inverter 100 connected between the set point circuitry 38 and the inverter 60 is accordingly bypassed and the CEMF set point signal at the input of the CEMF controller 62 becomes positive. The field voltage controller 70 then causes the field excitation to be reversed by operation of the reverse field converter 58.

To produce field reversal and armature braking current flow generally at the same time, the relay 94 is also operated when the actual speed is 5% over the set point speed. Thus, a negative speed error comparator 102 has a set point voltage $V_2$ corresponding to the 5% overspeed value. The tachometer signal and the output S from the load controller 36 are summed and inverted by an inverter 104 to operate the comparator 102 when the tachometer voltage reaches a value corresponding to the predetermined overspeed value.

With field current reversal and armature braking current flow, motor speed is controllably decreased until the braking control 82 is deactuated. For example, the dropout point of the relays 82 and 94 may be at a 1% overspeed condition and at that point the polarity of the CEMF set point signal is reversed to a negative polarity which results in forward field excitation. Simultaneously, the inverter 92 is bypassed by the relay contact 88 to effect armature current shut-off and internal converter voltage reversal by thyristor firing angle retardation in the converter 22. The reverse current model circuit 44 again becomes operative and final speed reduction to the set point value is achieved by coast-down. When the set point speed is reached, forward field excitation is continued and armature voltage and current control is produced as previously described.

In FIG. 2 there is shown in graphical form test data which illustrate the operation of a motor control arranged in accordance with the principles of the invention. At the start, the motor is operating at a set point speed as indicated by the reference character 106. The speed set point is then changed as indicated at the reference character 107 to command a new lower speed indicated by the reference character 108. The field voltage is reversed as indicated at the reference character 110 and shortly the field current is reversed as indicated at 112. With the flow of braking armature current 114, generator voltage is produced across the armature as indicated by the reference character 116 and motor speed drops by braking action as indicated by the reference character 118. Just before the speed 108 is reached, the field voltage and field current return to a forward direction as indicated by the reference characters 120 and 122.

The foregoing description has been presented only to illustrate the principles of the invention. Accordingly, it is desired that the invention not be limited by the embodiment described, but, rather, that it be accorded an interpretation consistent with the scope and spirit of its broad principles.

I claim:

1. A control system for a direct current motor comprising a unidirectional converter for supplying the motor armature current, an armature control responsive to a speed error signal to control said unidirectional converter and provide speed regulation by armature voltage and current control, a field control normally establishing forward field excitation, and means for applying reverse field excitation and for operating said armature control to produce braking armature current flow during at least a part of any time period when the actual motor speed exceeds the set point speed.

2. A control system as set forth in claim 1 wherein said applying and operating means becomes operative when the actual speed first reaches a first predetermined level above the set point speed and remains operative until the actual speed reaches a second predetermined level above the set point speed.

3. A control system as set forth in claim 1 wherein said unidirectional converter is a unidirectional thyristor converter, said armature control includes cascaded feedback loops including a speed controller responsive to the speed error signal, an armature current controller coupled to said speed controller so that the speed controller output forms the current controller set point, said applying and operating means includes means for reversing the polarity of the speed controller output signal, an armature voltage controller coupled to the output of said current controller, and means responsive to said voltage controller for effecting thyristor gating control in said converter.

4. A control system as set forth in claim 3 wherein said reversing means includes an armature voltage sensor, and means responsive to said voltage sensor and a set point voltage for inverting the speed controller output signal.

5. A control system as set forth in claim 1 wherein said field control includes a counterelectromotive force controller responsive to armature current and voltage and provided with a counterelectromotive force set point for CEMF regulation, said applying and operating means includes means for reversing the polarity of the counterelectromotive force set point, and means responsive to said counterelectromotive force controller for controlling the direction and magnitude of field voltage and field current.

6. A control system as set forth in claim 5 wherein means are provided for generating a speed set point signal for application to said armature control, means responsive to said set point generating means for generating the counterelectromotive force set point signal, and means responsive to the speed set point signal and an actual speed signal and another set point voltage for effecting polarity reversal of the counterelectromotive force set point signal.

7. A control system as set forth in claim 5 wherein the last mentioned means includes a gate controlled dual field thyristor converter.

8. A control system as set forth in claim 3 wherein said field control includes a counterelectromotive force controller responsive to armature current and voltage and provided with a counterelectromotive force set point for CEMF regulation, said applying and operating means further includes means for reversing the polarity of the counterelectromotive force set point, and means responsive to said counterelectromotive force controller for controlling the direction and magnitude of field voltage and field current.

References Cited
UNITED STATES PATENTS

| | | | |
|---|---|---|---|
| 3,007,099 | 10/1961 | Greening et al. | 318—331 X |
| 3,089,991 | 5/1963 | Stamm | 318—381 X |
| 3,250,975 | 5/1966 | Pepper | 318—302 X |

ORIS L. RADER, *Primary Examiner.*

J. J. BAKER, *Assistant Examiner.*